June 13, 1967 J. DASCOTTE 3,325,595

DATA TRANSMITTER FOR VARYING ALTERNATE ZERO-CROSSINGS OF A PERIODIC A.C. WAVE ABOUT THE MID-PERIOD POINT

Filed Aug. 12, 1963 3 Sheets-Sheet 1

Inventor
J. DASCOTTE
By Percy P. Lantzy
Attorney

Inventor
J. DASCOTTE
By [signature]
Attorney

Inventor
J. DASCOTTE
By [signature]
Attorney

United States Patent Office 3,325,595
Patented June 13, 1967

3,325,595

DATA TRANSMITTER FOR VARYING ALTERNATE ZERO-CROSSINGS OF A PERIODIC A.C. WAVE ABOUT THE MID-PERIOD POINT

Jean Dascotte, Versailles, France, assignor to International Standard Electric Corporation, New York, N.Y., a corporation of Delaware
Filed Aug. 12, 1963, Ser. No. 301,579
Claims priority, application France, Aug. 24, 1962, 907,749
17 Claims. (Cl. 178—67)

This invention relates to data transmission systems and more particularly to those systems for transmitting data by means of alternating current signals having at each instant one or the other of two possible signalling conditions.

Such transmission systems known in the prior art include frequency shift modulation systems wherein the signalling conditions are each characterized by a different frequency and phase shift modulation systems wherein the signalling conditions are each characterized by a different phase of a sinusoidal signal. In these two types of modulation, increasing difficulties occur when an increase of modulation rate is desired for a predetermined pass band, this representing the present trend. In fact, in a data transmission system over a telephone line having, for instance, a pass band from 900 to 2,400 cycles per second, defined by a variation of the transmission time inferior to a half-millisecond, and a modulation rate of, for instance, 1,500 bauds, whatever may be the type of modulation, the number of sinusoids for a signal representing each signalling condition is very reduced. Under these conditions the transient phenomena become comparatively important and the best efficiency of the frequency or phase discriminators generally used in the two above-mentioned types of modulation cannot be obtained.

Solutions to the transient problem have been presented. For instance, if frequency modulation, frequencies having predetermined relationship, depending upon the modulation rate are chosen. Then by providing coherent sources as sources of the two frequencies, and selecting the output of one of the other of the sources at the instants of condition changing, there will be provided for transmission sinusoidal signals of one or the other frequency having amplitudes of the same value with slopes of same sign.

One object of the present invention is to provide a data transmission system more suitable for the fast transmission rates on a line having a predetermined pass band.

According to a feature of the present invention, there is provided a signal for transmitting data capable of assuming either of two possible signalling conditions comprising an elementary alternating current signal having for each data bit a zero crossing in the same direction at the beginning of each bit and also at the end of each bit, a constant duration, a zero crossing only once intermediate the beginning and end of each bit, the intermediate zero crossing representing one of the two signalling conditions when occurring before the middle of the data bit and the other of the two signalling conditions when occurring after the middle of the data bit.

According to another feature of the invention each elementary signal as above defined does not include any D.C. component, that is, the areas defined by the curves representing these signals are equal above and below the zero amplitude axis.

According to still another feature of the invention, the elementary alternating current signal as defined above, does not comprise high order harmonics out of the transmission range, that is, such signals have a minimum number of upper harmonics.

According to a further feature of this invention, there is provided a system for transmitting data capable of assuming either of two possible signalling conditions comprising a source of sine waves having a given cyclic period; first means to translate the sine waves into a first alternating signal having a recurring period equal to and coincident with the given cyclic period and a zero crossing intermediate the zero crossings at the extremities of the recurring period occurring prior to the middle of the given cyclic period to define one of the two possible signalling conditions; a second means to translate the sine waves into a second alternating signal having a recurring period equal to and coincident with the given cyclic period and a zero crossing intermediate the zero crossings at the extremities of the recurring period occurring subsequent to the middle of the given cyclic period to define the other of the two possible signalling conditions; and means controlled by a source of data to select the first and second alternating signals for transmission in accordance with the signalling condition of the data.

According to still a further feature of this invention, there is provided means at the receiving end of the system above described responsive to the first and second alternating signals and in particular the zero crossings thereof to recover the data.

The above mentioned and other features and objects of the invention will become more apparent by reference to the following description taken in conjunction with the accompanying drawings, in which.

Figures 1, 2:
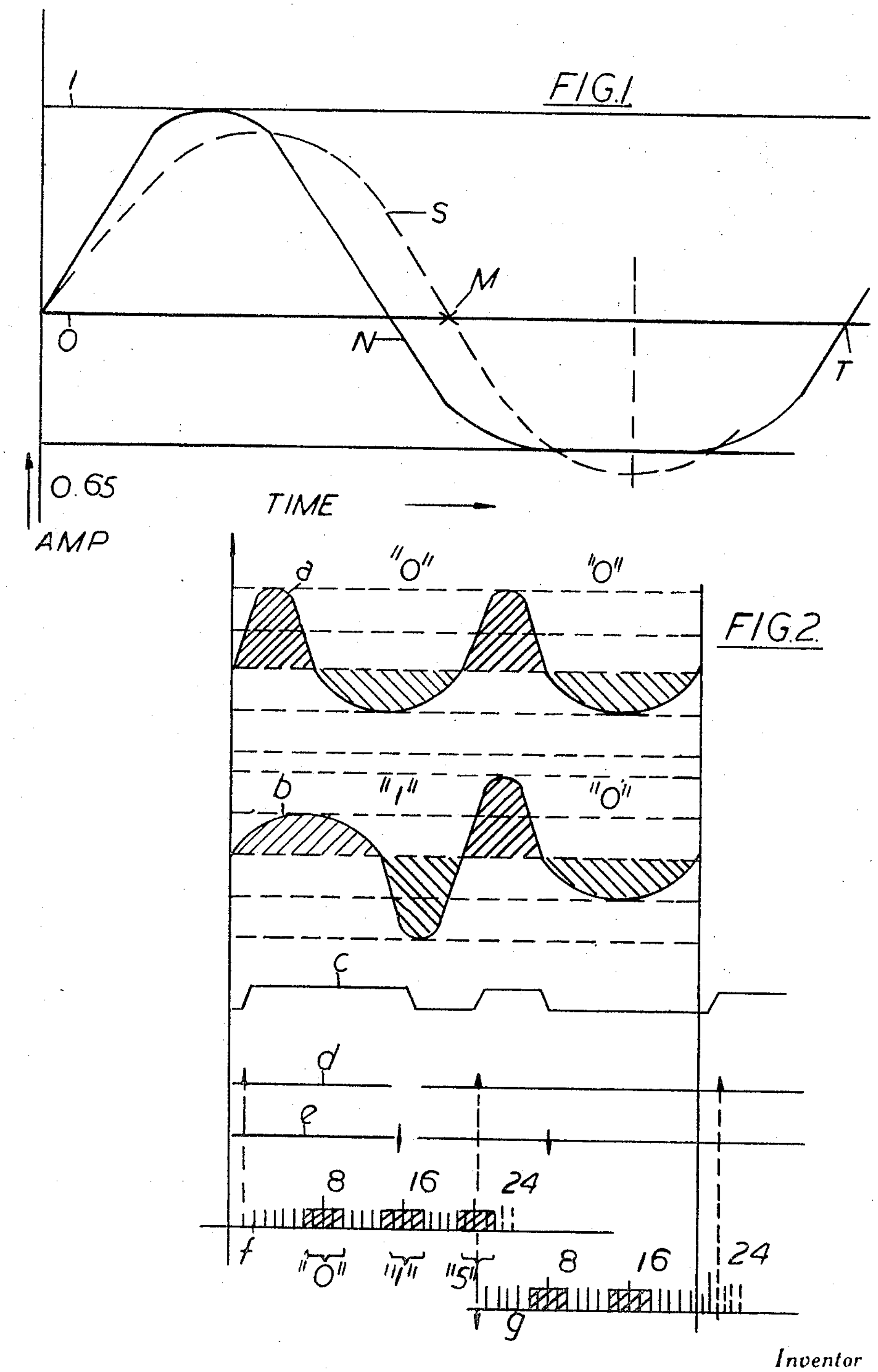
FIG. 1 illustrates an example of the elementary alternating current signal in accordance with the principles of this invention.
FIG. 2 illustrates various signals derived from the elementary signal.

Referring to FIG. 1, there is illustrated an amplitude versus time diagram of an example of one of the elementary alternating current signals employed in this invention. The illustrated elementary signal corresponds, for instance, to the binary condition "0," while the elementary signal corresponding to the binary condition "1" would be the elementary signal obtained by symmetry with respect to point M, the middle of the bit. Thus, in accordance with this invention each elementary signal representing "0" and each elementry signal representing "1" have the recurring period O–T coincident with the cyclic period O–T of the sine wave S. The condiiton "0" or "1" is identified by the intermediate zero crossing N. In the example employed herein "0" is represented by the elementary signal passing through zero (zero crossing N) before the middle M of the bit or, in other words, the elementary signal is progressively phase leading with respect to the sinusoid S, and the "1" condition is represented by the elementary signal passing through its intermediate zero crossing after the middle M, or in other words, the elementary signal is progressively phase lagging with respect to the sinusoid S. The elementary signals representing the two conditions have areas defined by the curve representing the elementary signals which are equal above and below the zero amplitude or time axis, thereby providing a zero D.C. (direct current) component for the transmitted signals. This fact is important since a D.C. component would not be transmitted by the currently used transmission means (telephone lines) and, thus, the circuits of the demodulator would be unable to reconstitute the zero crossings of the signals in conformity with the modulation.

The waveform of the elementary signals representing conditions "0" and "1" have been described in one way hereinabove. These waveforms may also be described as follows. For the "0" condition, the elementary signal grows phase leading with respect to the sinusoid S between O and N while between N and T the elementary signal lags to restore in phase with respect to the sinusoid S. For the "1" condition, the elementary signal grows phase lagging with respect to the sinusoid S between O and the intermediate zero crossing while between the intermediate zero crossing and the end of the bit T the elementary signal restores in phase with respect to the sinusoid S.

Another characteristic of the elementary signal is illustrated in FIG. 1 for signal "0" wherein the phase where it shifts to grow leading between O and N has an increased amplitude with respect to sinusoid S, while the amplitude of the elementary signal is decreased when the phase restores, that is, between N and T.

By way of example, the form of the elementary signal could be represented by one of the two following formulae:

$$i(x)=-\frac{1}{6}(\sin 5x+\sin x-4\sin 3x)+\sin 2x \qquad (1)$$

or:

$$r(x)=-\frac{1}{2}\cos 4x+\frac{1}{2}\cos 2x+\sin 2x \qquad (2)$$

Formula (1) represents the phase leading and restoring signal and formula (2) represents the phase lagging and restoring signal.

Moreover, it is to be noted that the two signals corresponding to said formulae generate a minimum of high harmonics regardless of the transmitted sequence of signalling conditions. More particularly, the transmission times of the important components of the signal are such that the intermediate zero crossing maintains a well characterized position of phase leading or phase lagging with respect to the middle of the bit.

Furthermore, these forms of signals have the advantage of being easily generated.

Figure 3:
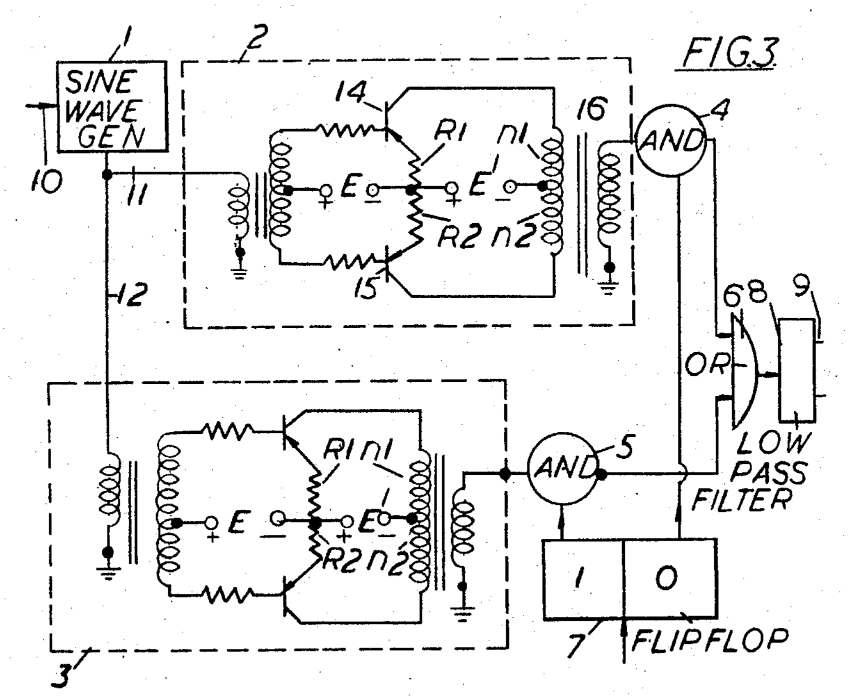
FIG. 3 is a schematic diagram partially in block form of an embodiment of the modulation equipment in accordance with the principles of this invention.

FIG. 3 illustrates an embodiment of a modulator according to the invention. It comprises sinusoidal generator 1 which could be synchronized from the outside through input 10, or having a steady frequency if it is, for instance, a quartz crystal-controlled generator. The output of sinusoidal generator 1 is connected to input 11 of generator 2 of signal form "0," and to input 12 of generator 3 of signal form "1." By way of example, generator 2 of signal form "0" is described in detail.

The signal from sinusoidal generator 1 is applied to the primary winding of transformer 13 the mid tap secondary winding of which is connected on the one hand to the base of transistor 14 and on the other hand to the base of transistor 15 through bias resistances. The collectors of transistors 14 and 15 are connected to the terminals of the mid tap primary winding of transformer 16. At the output of the secondary winding of transformer 16, the signal corresponds to condiiton "0" and has, for instance, the form shown in FIG. 1. The emitters of transistors 14 and 15 are connected to a bias through bias resistances $R_1$ and $R_2$. Transistors 14 and 15 are connected as push-pull amplifiers, the two halves of which have relatively different gains and the input of which is submitted to a bias voltage E. Thus, push-pull amplifiers cut up the sinusoid applied on 11 into two unequal parts, as shown by curves *a* and *b* of FIG. 4. The part of curve *a* above the straight line of ordinate E is amplified as well as the part of the curve under said ordinate to obtain curve *b* through transistors 14 and 15 in push-pull. The gains of the transistors are defined by bias resistances $R_1$ and $R_2$ of their emitters.

The outputs of generators 2 and 3 are connected to the first inputs of AND gates 4 and 5, respectively. The outputs of gates 4 and 5 are connected to inputs of OR gate 6 which provides the output signals transmitted on transmission line 9 after passing through low-pass filter 8. The second inputs of AND gates 4 and 5 are connected to two outputs of modulation flip-flop circuit 7, one of the outputs corresponding to condition "0" and the other one to condition "1."

The modulation applied to the input of flip-flop 7 is synchronized through appropriate known means (not shown) in relation to the output of generator 1, either synchronized externally or crystal stabilized, so that AND gate 4 or 5 is switched on at the time when the signals derived from generator 2 or 3 cross zero in an increasing direction.

Figure 5:
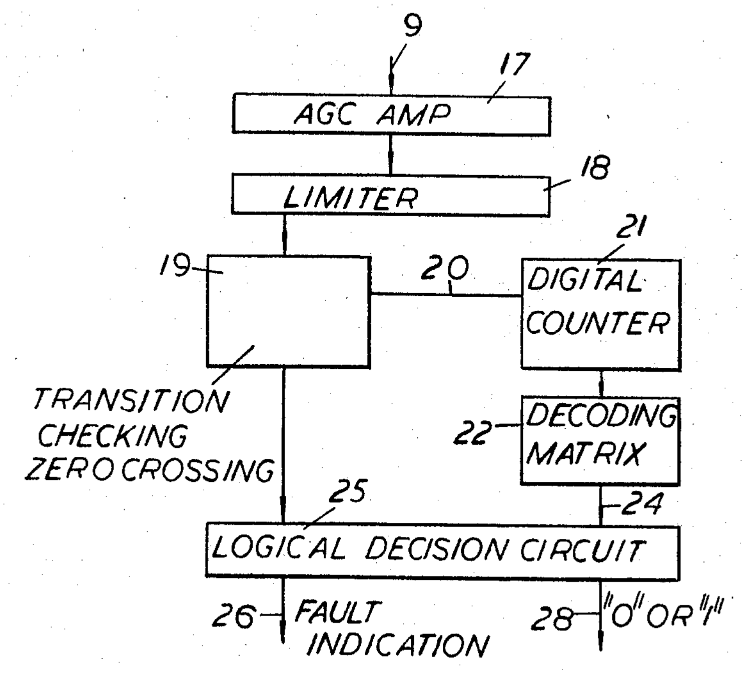
FIG. 5 is a schematic diagram in block form of an embodiment of the demodulation equipment in accordance with the principles of this invention.

Referring to FIG. 5, there is illustrated a block diagram of a demodulator for the data transmission system of this invention. Transmission line 9 is connected to the input of an automatic gain control amplifier 17 which is followed by a limiter 18 and a transition checking circuit 19. It will be noted that the latter is directly placed after the limiter so as to scan, on the one hand, the rising transitions of the signal and, on the other hand, the descending transitions. Each rising transition resets to zero a digital time counter 21 through conductor 20, said time counter being, for instance, a binary counter permanently supplied by fixed frequency pulses, that is, counting at a fixed rate. Time counter 21 is followed by a partial decoding matrix 22 which will define the expected instants corresponding to condition "0" and the expected instants corresponding to condition "1." The output of matrix 22 is connected to a logical decision circuit 25 which monitors each descending transition and, according to its position with respect to the number of pulses counted, delivers at its output 28 a "0" or a "1" during the operating procedure, or delivers at its output 26, a fault detection.

The decision criterion being related to a counting, it is possible through ordinary means to ease, or, on the contrary, to tighten the conditions of fault detection.

In FIG. 2, curve *a* shows the shape of two successive signals "0—0" whereas curve *b* shows the shape of a signal "1" followed by a signal "0." Curve *c* shows the shape of signals at the output of limiter 18 corresponding to the input of curve *b*. Curves *d* and *e* illustrate, by means of arrows directed upwards and downwards, the rising and descending transition instants. The curves *f* and *g* show the counting intervals of counter 21 and the time relations between a first counting *f* and a second counting *g* with resetting to zero at the instant of the second rising transition.

By way of example, let us assume that the counter be provided to be set to zero at the end of the bit, a short time after counting 24, as shown in FIG. 2, and that "0" condition be recognized by detecting the descending transition between the counts 6 and 10, "1" condition between the counts 14 and 18. Said counts 6, 10, 14 and 18 would have been obtained by decoding matrix 22 associated with counter 21.

If the descending transition occurs somewhere else than between the counts 6 to 10 or 14 to 18, a fault will be marked. It will be possible, at will, to mark also a fault if a second rising transition does not occur between counts 24 and 25 for signalling the end of the bit.

Now let us assume that it is desired to tighten the interpretation of disturbance or "possible fault." It is possible, by means of very simple modifications of the output of decoding matrix 22, to substitute, for instance, the interval 7–8 for 6–10, and the interval 15–17 for 14–18. On the other hand, it is not a great electronic complication to count the duration of a bit, for instance, by 64, 128 or 256 intervals rather than by 24, therefore it is obvious that the solution could be made as accurate as required.

It is possible to take into account that the distortion to which a "0" signal is submitted over the line is not the same if it has been preceded by different bits. The problem may be handled by only considering the distortion to which a "0" signal is submitted when it is preceded by a "0" signal or a "1" signal, and of course the same considerations are available for the "1" signal, the interpretation intervals being then subject to be modified consequently.

Figure 4:
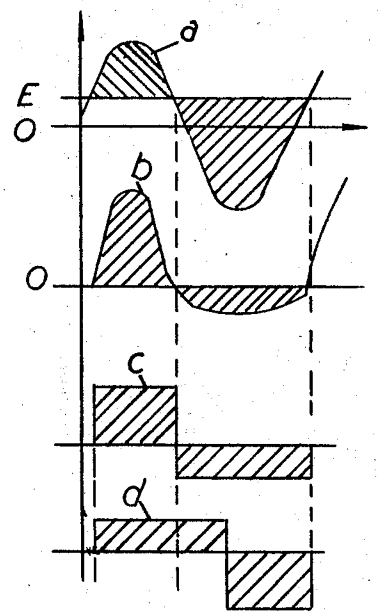
FIG. 4 illustrates various signals useful in explaining the operation of FIG. 3.

Alternatively, generators 2 and 3, FIG. 3, may be constituted by multivibrators adapted to provide signals having the shape shown by curves *c* and *d* of FIG. 4, said multivibrators being followed by low-pass filters eliminating harmonics having a rank higher than three and permitting to obtain output signals having approximately the waveform of curve *b*, FIG. 4.

While I have described above the principles of my invention in connection with specific apparatus, it is to be clearly understood that this description is made only by way of example and not as a limitation to the scope of my invention as set forth in the objects thereof and in the accompanying claims.

I claim:

1. A system for transmitting data capable of assuming either of two possible signalling conditions comprising:
a source of sine waves having a given cyclic period;
first means coupled to said source to translate said sine waves into first alternating signals having
a recurring period equal to and coincident with said given cyclic period, and
a zero crossing intermediate the zero crossings at the extremities of said recurring period occurring prior to the middle of said given cyclic period to define one of said two possible signalling conditions;
a second means coupled to said source to translate said sine waves into second alternating signals having
a recurring period equal to and coincident with said given cyclic period, and
a zero crossing intermediate the zero crossings at the extremities of said recurring period occurring subsequent to the middle of said given cyclic period to define the other of said two possible signalling conditions;
a source of data; and
third means coupled to said source of data and said first and second means to select said first and second alternating signals for transmission in accordance with the signalling condition of said data.

2. A system according to claim 1, wherein said first and second means each include a push pull amplifier couple to the input of said output transformer.

3. A system according to claim 1, wherein said first and second means each include an output transformer to deliver at the output thereof a signal wave having a zero direct current component.

4. A system according to claim 1, wherein said third means includes
an AND circuit coupled to the output of each of said first and second means and
an OR circuit coupled to the outputs of said AND circuits.

5. A system according to claim 1, wherein said first and second means each include
a push pull amplifier.

6. A system according to claim 5, wherein said third means includes
an AND circuit coupled to the output of each of said push pull amplifiers and
an OR circuit coupled to the outputs of said AND circuits.

7. A system for transmitting data capable of assuming either of two possible signalling conditions comprising:
a source of sine waves having a given cyclic period;
first means coupled to said source to translate said sine waves into first alternating signals having
a recurring period equal to and coincident with said given cyclic period, and
a zero crossing intermediate the zero crossings at the extremities of said recurring period occurring prior to the middle of said given cycle period to define one of said two possible signaling conditions;
a second means coupled to said source to translate said sine waves into second alternating signals having
a recurring period equal to and coincident with said given cyclic period, and
a zero crossing intermediate the zero crossings at the extremities of said recurring period occurring subsequent to the middle of said given cyclic period to define the other of said two possible signalling conditions;
a narrow band transmission medium;
a source of data; and
third means coupled to said source of data and said first and second means to select said first and second alternating signals for transmission in accordance with the signalling condition of said data.

8. A system according to claim 7, wherein said transmission medium includes a low-pass filter.

9. A system according to claim 7, wherein said third means includes
an AND circuit coupled to the output of each of said first and second means, and
an OR circuit coupled to the outputs of said AND circuit; and
a low-pass filter coupled to the output of said OR circuit.

10. A system for transmitting data capable of assuming either of two possible signalling conditions comprising:
a source of sine waves having a given cyclic period;
first means coupled to said source to translate said sine waves into first alternating signals having
a recurring period equal to and coincident with said given cyclic period, and
a zero crossing intermediate the zero crossings at the extremities of said recurring period occurring prior to the middle of said given cyclic period to define one of said two possible signalling conditions;
a second means coupled to said source to translate said sine waves into second alternating signals having
a recurring period equal to and coincident with said given cyclic period, and
a zero crossing intermediate the zero crossings at the extremities of said recurring period occurring subsequent to the middle of said given cyclic period to define the other of said two possible signalling conditions; and
a narrow band transmission medium;
a source of data coupled to said first and second means to select said first and second alternating signal for coupling to said transmission medium in accordance with the signalling condition of said data; and
means coupled to said transmission medium responsive to said first and second alternating signals to recover said data.

11. A system for transmitting data capable of assuming either of two possible signalling conditions comprising:
a source of sine waves having a given cyclic period;
first means coupled to said source to translate said sine waves into first alternating signals having
a recurring period equal to and coincident with said given cyclic period, and
a zero crossing intermediate the zero crossings at the extremities of said recurring period occurring prior to the middle of said given cyclic period to define one of said two possible signalling conditions;

a second means coupled to said source to translate said sine waves into second alternating signals having a recurring period equal to and coincident with said given cyclic period, and a zero crossing intermediate the zero crossings at the extremities of said recurring period occurring subsequent to the middle of said given cyclic period to define the other of said two possible signalling conditions;

a narrow band transmission medium;

a source of data coupled to said first and second means to select said first and second alternating signal for coupling to said transmission medium in accordance with the signalling condition of said data; and means coupled to said transmission medium responsive to the zero crossings of said first and second alternating signals to recover said data.

12. A system for transmitting data capable of assuming either of two possible signalling conditions comprising:

a source of sine waves having a given cyclic period;

first means coupled to said source to translate said sine waves into first alternating signals having a recurring period equal to and coincident with said given cyclic period, and a zero crossing intermediate the zero crossings at the extremities of said recurring period occurring prior to the middle of said given cyclic period to define one of said possible signalling conditions;

a second means coupled to said source to translate said sine waves into second alternating signals having a recurring period equal to and coincident with said cyclic period, and a zero crossing intermediate the zero crossings at the extremities of said recurring period occurring subsequent to the middle of said given cyclic period to define the other of said two possible signalling conditions; and a narrow band transmission medium;

a source of data coupled to said first and second means to select said first and second alternating signal for coupling to said transmission medium in accordance with the signalling condition of said data; and means coupled to said transmission medium responsive to said first and second alternating signals to recover said data when said first and second alternating signals are correctly received and to provide a fault indication when said first and second alternating signals are incorrectly received.

13. A system according to claim 12, wherein said means to recover and provide includes an amplitude limiter coupled to said transmission medium;

a transition checker coupled to said limiter to detect rising and descending transitions;

a counter counting at a fixed rate coupled to said checker responsive to said rising transitions for resetting the count of said counter to zero;

a means coupled to said counter to identify counts corresponding to the position of said intermediate zero crossing for both said signalling conditions; and means coupled to said checker and said means to identify counts to provide either of said signalling conditions when correctly received and a fault indication when either of said signalling conditions are incorrectly received.

14. A system for transmitting data capable of assuming either of two possible signalling conditions comprising:

first means to generate first alternating signals having a recurring period equal to and coincident with a given cyclic period, and a zero crossing intermediate the zero crossings at the extremities of said recurring period occurring prior to the middle of said given cyclic period to define one of said two possible signalling conditions; and second means cooperatively associated with said first means to generate second alternating signals having a recurring period equal to and coincident with said given cyclic period, and a zero crossing intermediate the zero crossings at the extremities of said recurring period occurring subsequent to the middle of said given cyclic period to define the other of said two possible signalling conditions.

15. A system according to claim 14, wherein said first and second means each include a means to deliver at the output thereof a signal wave having a zero direct current component.

16. A system for transmitting data capable of assuming either of two possible signalling conditions comprising:

a source of sine waves having a given cyclic period;

first means coupled to said source to translate said sine waves into first alternating signals having a recurring period equal to and coincident with said given cyclic period, and a zero crossing intermediate the zero crossings at the extremities of said recurring period occurring prior to the middle of said given cyclic period to define one of said two possible signalling conditions; and second means coupled to said source to translate said sine waves into second alternating signals having a recurring period equal to and coincident with said given cyclic period, and a zero crossing intermediate the zero crossings at the extremities of said recurring period occurring subsequent to the middle of said given cyclic period to define the other of said two possible signalling conditions.

17. A system according to claim 16, wherein said first and second means each include means to deliver at the output thereof a signal wave having a zero direct current component.

References Cited

UNITED STATES PATENTS 3,102,238 8/1963 Bosen ............ 328—27

FOREIGN PATENTS 3,121,197 2/1964 Ireland.

DAVID G. REDINBAUGH, *Primary Examiner.*

S. J. GLASSMAN, J. T. STRATMAN, *Assistant Examiners.*